June 23, 1959   D. B. McCORMICK   2,891,822
TRACK CLOSURE
Filed Nov. 9, 1956   2 Sheets-Sheet 1
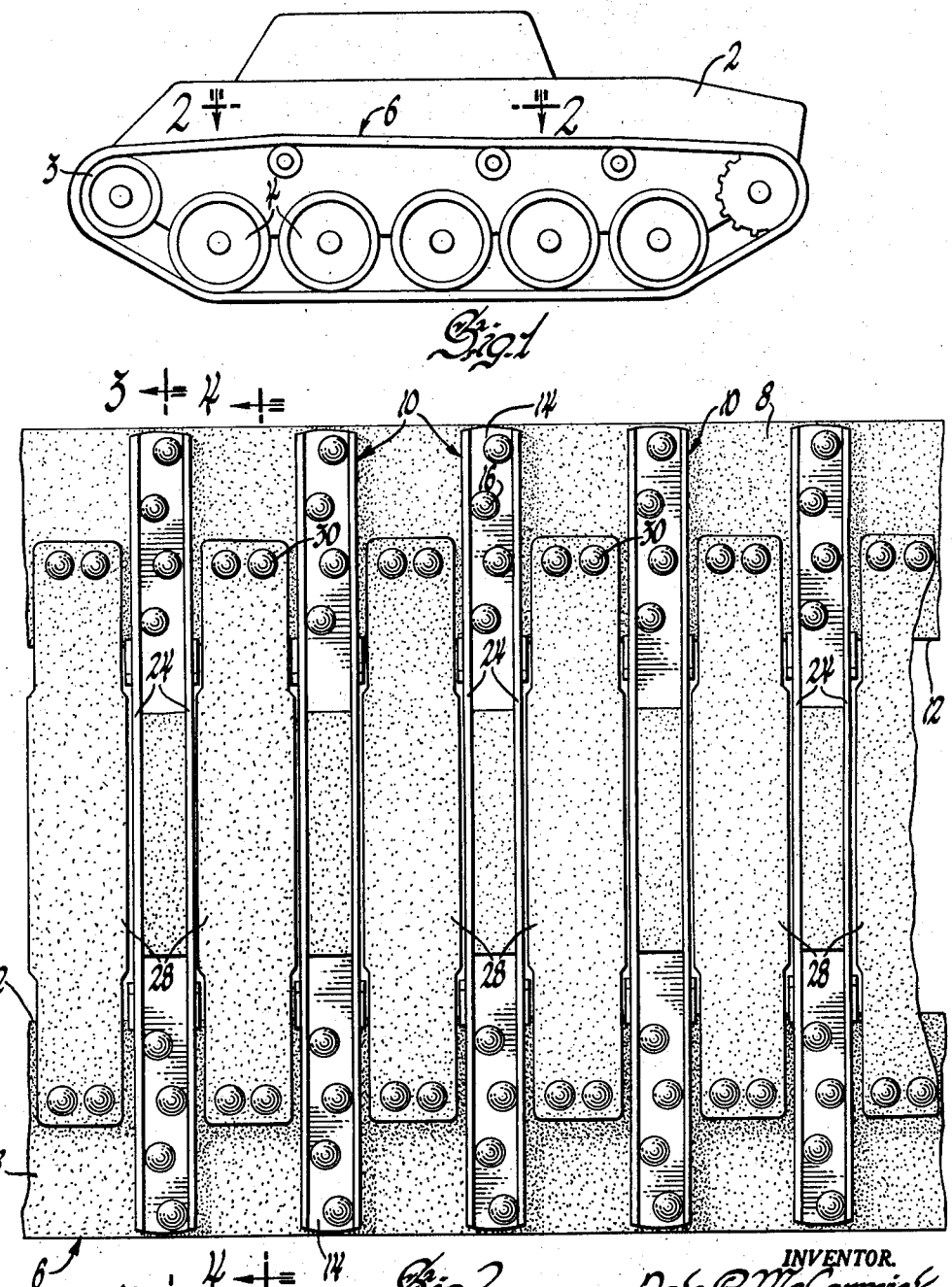
INVENTOR.
Dale B. McCormick
BY
R. P. Barnard
ATTORNEY

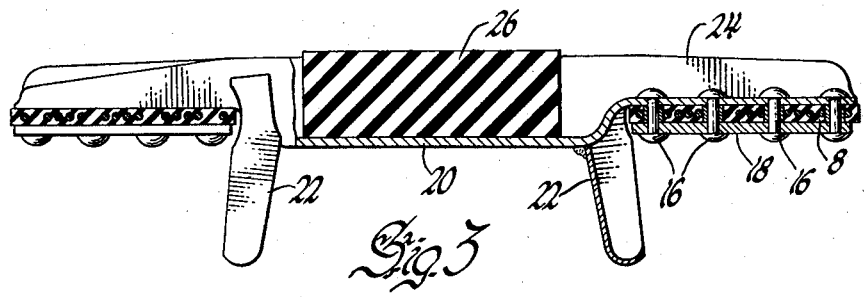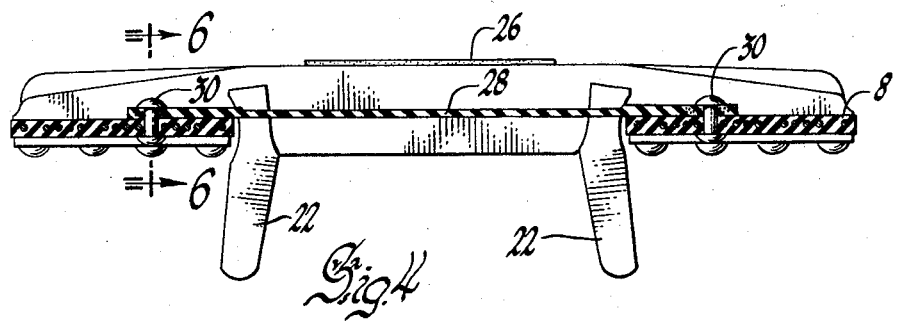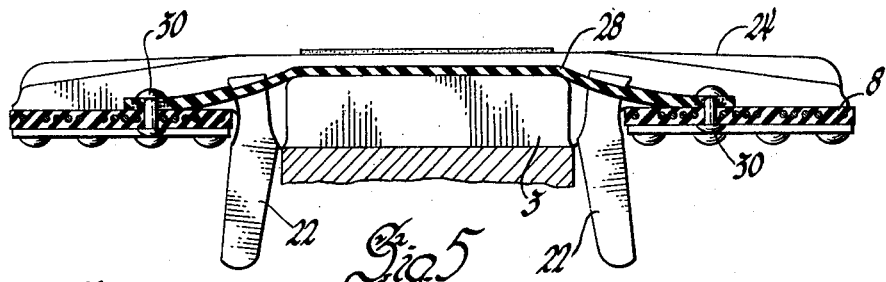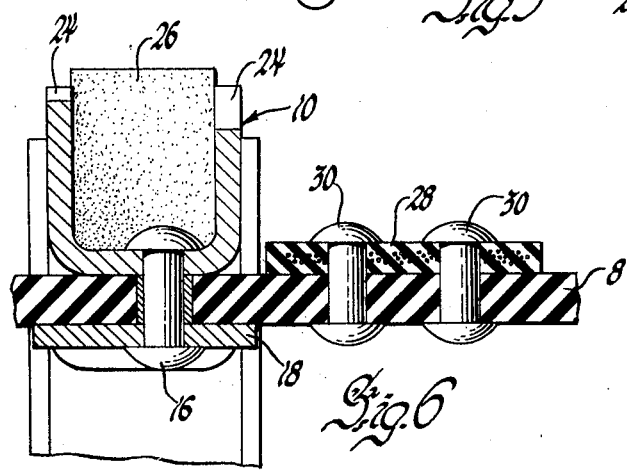

United States Patent Office 2,891,822
Patented June 23, 1959

2,891,822

TRACK CLOSURE

Dale B. McCormick, Detroit, Mich., assignor to General Motors Corporation, Detroit, Mich., a corporation of Delaware Application November 9, 1956, Serial No. 621,264

8 Claims. (Cl. 305—10)

This invention relates to an endless flexible track adapted for entrainment about one or more driving or idler wheels of a vehicle and, in particular, to a means for providing a self-cleaning action for the track thereby reducing or virtually eliminating lateral misalignment of the track between the spaced vehicle wheels, reducing track wear and decreasing track breakage; and relating, in general, to a means for increasing the flotation and traction of the vehicle as it traverses terrain having low stability such as snow, sand, and loose soils.

In the development of track-laying vehicles, particularly military vehicles such as amphibians and self-propelled gun mounts, lightweight flexible tracks have been designed comprising a plurality of laterally spaced flexible belts straddling longitudinally spaced vehicle wheels, and between which belts there are connected a plurality of circumferentially spaced track shoes having an inner portion for entrainment about the vehicle wheels and an oppositely disposed ground-engaging cleat or grouser portion to increase vehicle traction as it crosses irregular terrain. The flexible belts and the spacing of the track shoes have been employed in order to reduce the weight of the tracks. While such lightweight track constructions are commonly used with various types of military vehicles, they are not exclusively employed therewith but rather are to be found on lightweight track-laying commercial or civilian vehicles for towing purposes in snow, ice, swamp areas, and the like, and as a means for transportation in Arctic and desert regions or wherever a lightweight track-laying vehicle is desired.

One principal difficulty encountered with such a track having circumferentially spaced shoes, as well as with heavy-duty tracks in which the track shoes are articulated and adjacently interconnected, is that rock, snow, loose terrain and other materials tend to become lodged between the inner surface of the track and the wheels over which it is entrained. As a result, the track climbs into misalignment with the longitudinally spaced wheels and undue stress is placed upon the track thereby increasing track wear and the possibility of track breakage. For instance, it is not uncommon to see a track-laying vehicle pick up rocks of substantial size which become trapped in the track and make many circuits about the vehicle wheels without being thrown from the track.

Furthermore, because of the relative spacing between adjacent track shoes, a vehicle equipped with such a track has a tendency to sink while traversing terrain of low stability, loose granular snow being a particular example. Also the tractive effort of the vehicle is reduced because of the reduced resistance between the track shoe grouser and such a loose granular terrain.

To avoid these and other disadvantages, flexible track closures may be mounted between the laterally spaced track belts to fill the openings between adjacent circumferentially spaced track shoes. These closures normally extend tautly horizontally between the two laterally spaced belts and aid in compacting the terrain to increase traction. As the track passes about the various vehicle wheels, these closures come into engagement with the wheels which flex the closures outwardly allowing snow, sand, loose dirt and other foreign materials to be expelled from the track. Because of the aforementioned valvular action of the track closure, the track cleans itself; as a result, foreign material is not permitted to lodge between the various vehicle wheels and the track entrained about them thereby preventing track climb and avoiding placing abnormal stresses on the track thereby reducing track wear and breakage.

It is, therefore, an object of this invention to provide an endless flexible track of the type comprising a plurality of circumferentially spaced track shoes interconnecting laterally spaced track belts defining therebetween openings, and a track closure for such openings which provides a self-cleaning action to prevent track climb, reduce track wear, decrease track breakage and compact the terrain to be traversed by the vehicle thereby increasing its flotation and traction.

It is another object of this invention to provide a track closure for an endless flexible track of the type described which is composed of a flexible material normally lying substantially in the ground-engaging plane of the track but which, upon entrainment about a vehicle drive, supporting or idler wheel, will act as a valve flexing outwardly from the track to expel any material becoming lodged between such wheel and the track.

These and other objects and advantages of this invention will appear more fully hereinafter as the description proceeds, reference being made to the accompanying drawings, in which like numerals in the various views refer to like parts, and in which:

Figure 1 is a view of a vehicle equipped with the track of this invention;

Figure 2 is a fragmentary plan view of the track along line 2—2 of Figure 1;

Figure 3 is a partial cross section of the track along line 3—3 of Figure 2;

Figure 4 is a cross section along lines 4—4 of Figure 2;

Figure 5 is a cross sectional view corresponding to Figure 4 showing the track entrained about a vehicle wheel;

Figure 6 is a cross section along line 6—6 of Figure 4.

Referring now to the drawings, there is disclosed an endless track vehicle 2 having entrained at either side thereof about an idler wheel 3 and a plurality of longitudinally spaced vehicle wheels 4, an endless flexible track 6. Any desired number of the vehicle wheels may be idler wheels or supporting wheels with suitable means being operatively connected to the vehicle power plant to drive the track. For example, a drive sprocket may be connected to the power plant to supply the track drive. Furthermore, the track of this invention may be employed with a rubber tired vehicle or with a conventional crawler tractor construction.

Each endless flexible track comprises a plurality of laterally spaced flexible belts 8 which straddle the wheels 3 and 4. In the illustration, two such belts are shown, but it will be readily apparent that three or more may be employed if dual or other such wheel arrangements are found on the vehicle.

The laterally spaced belts 8 are transversely interconnected by a plurality of circumferentially spaced rigid track shoes 10 which, in conjunction with the track belts, define therebetween a plurality of spaced openings 12 about the track. Each shoe has laterally extending side portions 14 riveted or otherwise secured at 16 to the track belts 8 and reinforcing metal backing plates 18. Each shoe has a centrally located inner wheel-engaging portion 20 terminating at either side thereof in diverging walls 22 thereby forming a supporting seat for the wheels. Oppositely disposed to the wheel-engaging seat of the shoe is an outer ground-engaging portion comprising two depending laterally extending grousers or cleats 24 between which there is secured a block 26 of rubber or other resilient material. It will be noted that the lower ground-engaging edge of this block extends beyond the plane in which the ground-engaging edges of the cleats 24 lie. As a result, the rubber blocks prevent substantial damage being done to the surface of an improved road over which the vehicle of necessity must periodically travel.

A plurality of flexible track closures 28 for the openings 12 are bolted or otherwise suitably secured to the outer or ground-engaging surfaces of the laterally spaced belts 8 by means of the bolts 30. These closures extend normally tautly horizontally over the openings 12 substantially in the ground-engaging plane of the belts 8 as shown in Figure 4, but may flex outwardly from the track as the track section in which it is employed runs about a vehicle idler wheel 3 as shown in Figure 5. These closures may be made of any suitable flexible material, but it is preferable to form them of rubber reinforced with suitable material such as nylon.

In operation, as the track 6 runs on the ground between the longitudinally spaced vehicle wheels 4, the flexible closure aids in compacting the terrain thereby increasing flotation and traction. Upon entrainment of a track section, comprising two or more track shoes between which there is positioned the track closure, about one of the vehicle idler wheels 3, the wheel will engage the inner surface of the closure and flex it outwardly. At such a time the closure acts as a valve to permit dislodgement of any material becoming trapped between the belt and the idler wheel, thereby preventing track climb or lateral misalignment between the spaced vehicle wheels and reducing track wear and breakage by eliminating a source of abnormal track stress.

It may therefore be seen that the track closure of this invention may be adapted to any flexible endless track of the type described employing circumferentially spaced track shoes thereby increasing vehicle flotation and traction by compacting the terrain over which the vehicle travels while at the same time providing a valve for the track resulting in a self-cleaning action. As the track closure of this invention may be utilized with any endless track of the type described, it is not intended to limit this invention to a particular type of track-laying vehicle but only by the scope of the appended claims.

I claim:

1. An endless flexible track for a vehicle comprising, a plurality of shoes spaced around said track defining openings therein, said shoes having a ground-engaging surface and an oppositely disposed surface for entrainment about a vehicle wheel, and flexible closures for said openings normally lying substantially in the ground-engaging plane of said track and adapted for flexing movement out of said plane upon engagement with said vehicle wheel.

2. An endless flexible track for entrainment about a plurality of spaced vehicle wheels, said track comprising laterally spaced flexible belts straddling said wheels, a plurality of circumferentially spaced rigid shoes interconnecting said belts and defining openings therebetween, said shoes having a surface substantially in the plane of said belts for entrainment about said wheels and having an oppositely disposed ground-engaging cleat, flexible closures for said openings, said closures normally lying substantially in the plane of said belts, and flexing outwardly from said belt upon entrainment about said wheels.

3. An endless flexible track for a vehicle comprising a plurality of spaced shoes, said shoes having a ground-engaging surface and a surface for entrainment about a vehicle wheel, and flexible means mounted in the spaces between adjacent shoes for flexible movement relative thereto upon engagement with said wheel to form track openings permitting dislodgment therethrough of foreign material trapped between said track and wheel.

4. An endless flexible track for entrainment about a plurality of vehicle wheels comprising laterally spaced belts, a plurality of spaced shoes interconnecting said belts, and flexible means mounted in the spaces between adjacent shoes for flexing movement relative thereto upon engagement with a wheel to form track openings permitting dislodgment therethrough of foreign material trapped between said track and wheels.

5. An endless flexible track for entrainment about a plurality of wheels comprising laterally spaced belts, a plurality of shoes interconnecting said belts and spaced from each other to define openings therebetween, and flexible closures for said openings, said closures being flexible relative to said shoes to uncover said openings upon entrainment about a wheel thereby permitting dislodgment through said openings of foreign material trapped between said track and wheels.

6. An endless flexible track comprising a plurality of spaced interconnected track sections, each of said sections comprising spaced track shoes defining an opening therebetween, and a flexible closure for each of said track section openings, said closures being flexible relative to said shoes to uncover said openings thereby permitting dislodgment therethrough of foreign material trapped within said track sections.

7. An endless flexible track for entrainment around a plurality of spaced vehicle wheels, said track comprising a plurality of spaced rigid shoes defining openings therebetween, and flexible closures for said openings, said closures lying substantially in the ground-engaging plane of said shoes between said wheels, and flexing outwardly from said track to uncover said openings upon entrainment about a wheel thereby permitting dislodgment through said openings of foreign material trapped between said track and wheels.

8. An endless flexible track for entrainment about a plurality of spaced vehicle wheels, said track comprising laterally spaced flexible belts straddling said wheels, a plurality of spaced rigid shoes interconnecting said belts and forming openings therebetween, said shoes having an inner wheel-engaging surface and an outer ground-engaging cleat, and flexible closures for said openings interconnecting said belts, said closures lying substantially in the plane of said belts in a portion of track between said wheels, and flexing outwardly from said track to uncover said openings upon entrainment about a wheel, thereby permitting dislodgment through said openings of foreign material trapped between said track and wheels.

References Cited in the file of this patent

UNITED STATES PATENTS

| | | |
|---|---|---|
| 2,025,999 | Myers | Dec. 31, 1935 |
| 2,186,979 | Knox | Jan. 16, 1940 |
| 2,332,313 | Galanot | Oct. 19, 1943 |
| 2,786,725 | Thorne | Mar. 26, 1957 |

FOREIGN PATENTS

| | | |
|---|---|---|
| 600,343 | Great Britain | Apr. 6, 1948 |
| 601,929 | Great Britain | May 14, 1948 |